United States Patent [19]

Resende

[11] Patent Number: 4,592,479

[45] Date of Patent: Jun. 3, 1986

[54] PRESSURE COOKER HAVING VENT MEANS

[75] Inventor: Irineu Resende, Sao Paulo, Brazil

[73] Assignee: Alcan Aluminio Do Brasil S/A, Sao Paulo, Brazil

[21] Appl. No.: 647,115

[22] Filed: Sep. 4, 1984

[30] Foreign Application Priority Data

Sep. 22, 1983 [BR] Brazil .............................. 8305177[U]

[51] Int. Cl.$^4$ ............................................. B65D 51/16
[52] U.S. Cl. .................... 220/209; 220/298; 220/303; 220/304
[58] Field of Search ............. 220/209, 298, 303, 304, 220/316, 366

[56] References Cited

U.S. PATENT DOCUMENTS 4,276,990  7/1981  Chiodo ................................. 220/209

*Primary Examiner*—George T. Hall

*Attorney, Agent, or Firm*—Christie, Parker & Hale

[57] ABSTRACT

An improved pressure cooker of the type having a container and a lid. The container has an open mouth with an outer rim having spaced, outwardly projecting rim portions. The lip includes a peripheral, depending lip provided with spaced, inwardly projecting lip portions. The lid is coupled to the container to cover the mouth by positioning and twisting the lid such that the lip portions engage the underside of the rim portions thereby coupling the lid to the container. A seal ring is interposed between the lid and rim. The lid further includes a pressure regulator. The improvement according to the present invention includes a safety valve formed by an aperture cut out of the lip between the lip portions and located to lie adjacent the seal ring. In response to overpressurization of the cooker, a portion of the ring is urged from between the rim and lid into the aperture to provide a passageway through which the pressure is allowed to escape.

2 Claims, 5 Drawing Figures

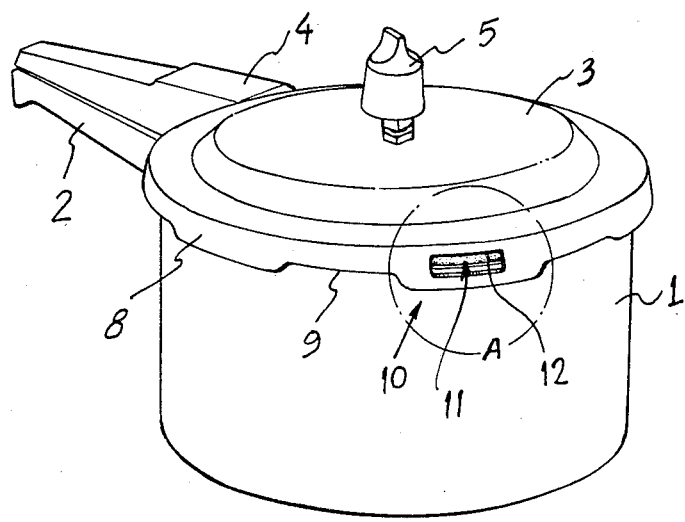
FIG.1
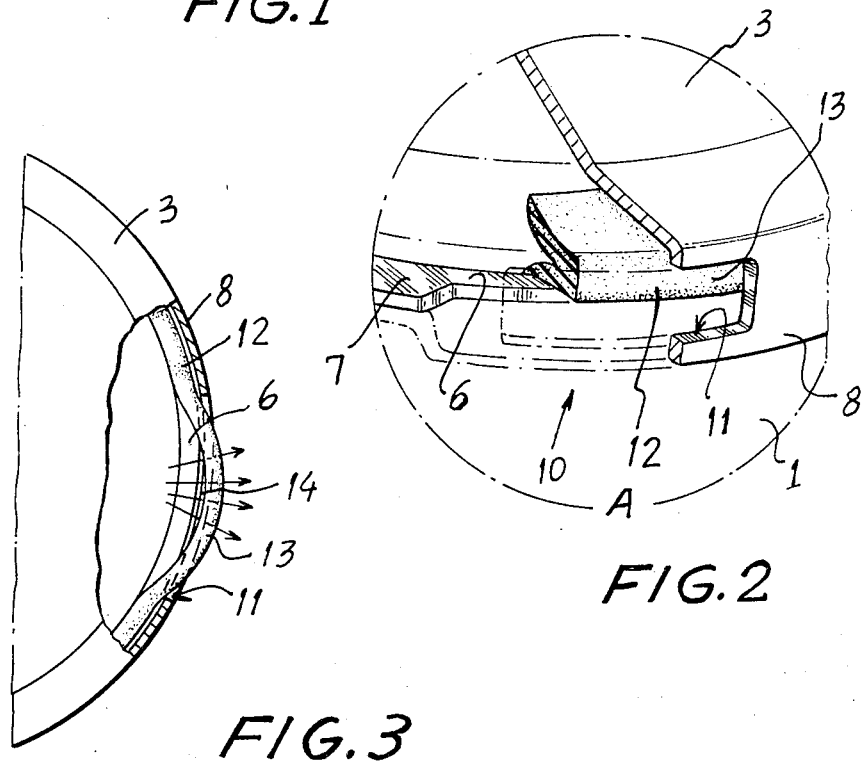
FIG.2
FIG.3

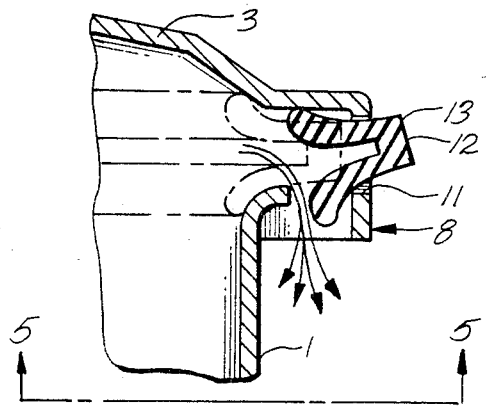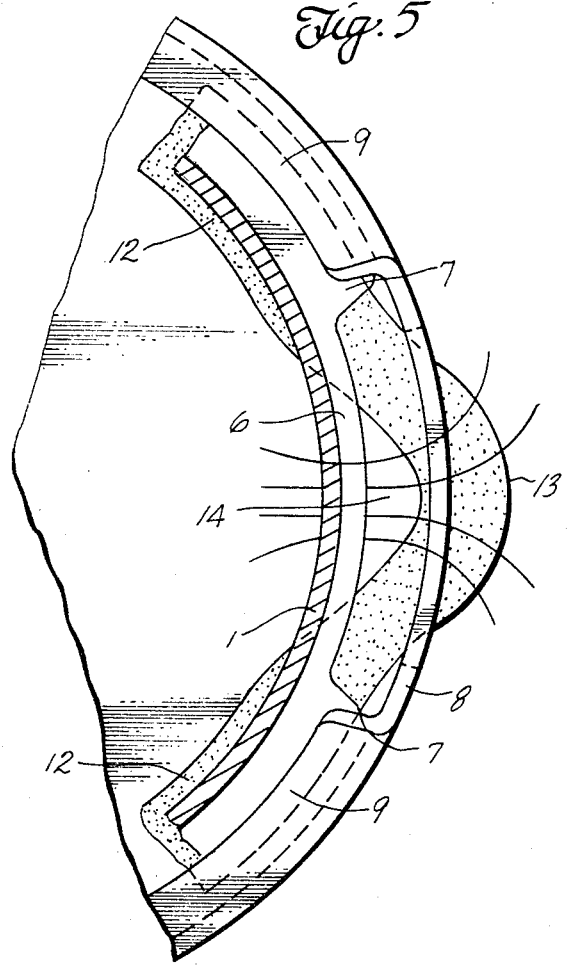

PRESSURE COOKER HAVING VENT MEANS

FIELD OF THE INVENTION

This invention relates to an improvement in a pressure cooker. More particularly it relates to a safety valve for a pressure cooker.

BACKGROUND OF THE INVENTION

It is known that a pressure cooker usually comprises a container and a lid. Both the container and lid are provided with radial handles for lifting purposes. The lid is further provided with a central pressure relief valve and with a safety valve which is intended to relieve the pressure in the event that the relief valve, for some reason or other, fails to operate.

The aforementioned safety valve is usually comprised by a rubber plug located in a corresponding aperture formed in the lid, the plug being expelled when the pressure rises beyond a specified value that is understood as being safe.

No matter how widely used this type of safety valve is, it is still not altogether satisfactory because the aforementioned rubber plug will harden after a certain period of service. The pressure required to expel the hardened rubber plug is beyond that which is understood as being safe. Additionally, upon being expelled, the rubber plug is ejected with extreme violence endangering the user of the pressure cooker. Further, following ejection of the plug the aperture is open enabling the product being cooked to be expelled therethrough in such a manner as to stain the ceiling, stove, adjoining walls and floor.

A further inconvenience associated with this type of safety valve is that the aforementioned plug is a very slow-moving article from a marketing standpoint. This means that the specialized home applicance stores are seldom inclined to carry stocks of the plug. Accordingly, the users of pressure cookers incorporating this type of safety valve run into extreme difficulties when faced with the need to replace the plug.

SUMMARY OF THE INVENTION

In view of such problems and with the intention of overcoming them, the improvement, according to the present invention, provides pressure cookers with a unique safety valve. The safety valve essentially consists of a cutout formed on the surrounding rim of the lid and located at the same level as the sealing ring, which is placed between the latter and the rim of the container immediately adjacent to the mouth of the cutout.

The safety valve so designed does away with all the problems associated with the conventional design as described. When the pressure inside the cooker rises to values beyond those which are considered to be safe, the portion of the sealing ring located adjacent to the aforementioned cutout is pushed out therethrough, so as to form a passageway between the rim of the container and the rim, through which the pressure is relieved until it drops to permissible values. Once pressure has been relieved the ring returns to its original position, everything happening in such a manner as to not cause ejection of the plugs or of the product being cooked, which are hazardous to the user of the pressure cooker, or to jeopardize the good condition of the wall, ceiling, or stove itself.

A further advantage of the present invention is that the safety valve is embodied, in part, from the normally used sealing ring of the pressure cooker. The sealing ring is easily replaced by the user and is readily available through the appropriate retail outlets, accordingly avoiding the difficulties encountered with the prior art designs.

This form of valve design can be provided with a relatively large aperture to allow overpressure to escape. This affords complete safety even in view of the possibility of eventual clogging which has impaired prior art safety valves causing impairment at a time of necessity.

BRIEF DESCRIPTION OF THE DRAWINGS

To better visualize the construction and operation of the pressure cooker built in accordance with the present improvement, drawings are provided wherein:

FIG. 1 is a side perspective view of a closed pressure cooker according to the present invention;

FIG. 2 is an enlarged partially cutaway view of detail, "A" of FIG. 1;

FIG. 3 is a partial plan view of the lid for the pressure cooker showing the operation of the safety valve to relieve pressure;

FIG. 4 is an enlarged section view of a portion of the pressure cooker according to the present invention showing the venting of the cooker through the safety valve; and FIG. 5 is a veiw of a portion of the cooker taken along line 5—5 of FIG. 4.

DETAILED DESCRIPTION

In accordance with the above-listed drawings, the pressure cooker according to the present invention is of the type which is essentially comprised by the pan or container 1 which has a radial handle 2. The container 1 receives a lid 3, also provided with a handle 4, which is shown as being superimposed on handle 2. The lid 3 also includes a central pressure relief valve 5.

The peripheral portion of the mouth or opening of container 1 is provided with one of the components of a closing means embodied by an orthogonally outwardly projecting outer rim 6 with regularly spaced wider rim portions 7. The lid 3 is provided with another component of said closing means which is embodied by a downwardly projecting lip 8 with regularly spaced, radially inwardly turned portions 9. When the lid 3 is positioned on the container 1 the portions 9 extend through the narrow portions of container rim 6 between the rim portions 7. In response to an angular motion being applied to lid 3 in relation to container 1 via the handles 2 and 4, the lip portions 9 become coupled under the wider portions 7 of the container rim 6 attaching the lid to the container.

In the pressure cooker according to the present invention, the improvement consists in providing it with a safety valve 10 formed in part by a rectangular aperture 11 cut out of a portion of lip 8 of lid 3. The aperture 11 is located between the portions 9 and is disposed at the same level as a resilient rubber ring 12, which acts as a sealing means between lid 3 and container 1. A portion of the ring 13 in FIG. 3 is designated as being located adjacent to said aperture 11. When the pressure inside the pressure cooker increases beyond a safe value, the ring portion 13 is pushed out into and through the aperture 11 to provide a passageway 14 between rim 6 on container 1 and the ring 12 itself through which the internal pressure is allowed to escape.

Obviously, the resilience of ring 12 will make it return to its usual position when the pressure drops to a safe value.

What is claimed is:

1. In a pressure cooker of the type having a container and a removable lid, a central pressure relief valve and means for coupling the lid to the container including a rim on the container having spaced outwardly projecting rim portions, a downwardly directed lip on the lid including spaced inwardly turned portions each adapted to trap a rim portion when the lid is positioned on and rotated relative to the container, and a resilient sealing ring disposed between the rim and lid, the improvement comprising:

said lid lip is provided with a radially directed aperture disposed between adjacent turned portions and adapted to register with a portion of the sealing ring when the lid is coupled to the container, said sealing ring portion resiliently displaced through the aperture in response to pressure cooker overpressure, said displaced ring portion defining a downwardly directed vent between said lid and adjacent rim portions.

2. The proessure cooker of claim 1 wherein the aperture is rectangular.

* * * * *